United States Patent
Singh et al.

(10) Patent No.: US 8,526,072 B2
(45) Date of Patent: *Sep. 3, 2013

(54) METHODS, SYSTEMS, AND COMPUTER PROGRAM PRODUCTS FOR PROTECTING INFORMATION ON A USER INTERFACE BASED ON A VIEWABILITY OF THE INFORMATION

(75) Inventors: Mona Singh, Cary, NC (US); Jared S. Fry, Boston, MA (US)

(73) Assignee: Armstrong, Quinton Co. LLC, Wilmington, DE (US)

( * ) Notice: Subject to any disclaimer, the term of this patent is extended or adjusted under 35 U.S.C. 154(b) by 372 days.

This patent is subject to a terminal disclaimer.

(21) Appl. No.: 12/828,346

(22) Filed: Jul. 1, 2010

(65) Prior Publication Data

US 2010/0266162 A1    Oct. 21, 2010

Related U.S. Application Data

(63) Continuation of application No. 11/316,424, filed on Dec. 22, 2005, now Pat. No. 7,774,851.

(51) Int. Cl.
*H04N 1/40*    (2006.01)
*G06F 7/04*    (2006.01)

(52) U.S. Cl.
USPC ............ 358/474; 726/1; 726/2; 726/4; 726/7; 726/17; 726/21; 726/26; 726/27; 726/28; 726/30; 726/34; 713/193; 713/194; 358/466

(58) Field of Classification Search
USPC .................................... 726/26; 358/466, 474
See application file for complete search history.

(56) References Cited

U.S. PATENT DOCUMENTS

| | | | |
|---|---|---|---|
| 5,231,674 A * | 7/1993 | Cleveland et al. ............ | 382/117 |
| 5,493,692 A | 2/1996 | Theimer et al. | |
| 5,886,683 A * | 3/1999 | Tognazzini et al. ........... | 715/700 |
| 5,912,721 A | 6/1999 | Yamaguchi et al. | |
| 6,111,517 A * | 8/2000 | Atick et al. ................... | 340/5.83 |
| 6,390,367 B1 * | 5/2002 | Doig .............................. | 235/436 |
| 6,552,850 B1 * | 4/2003 | Dudasik ................... | 359/486.02 |
| 6,842,877 B2 | 1/2005 | Robarts et al. | |
| 6,847,351 B2 | 1/2005 | Noguera | |
| 6,874,127 B2 | 3/2005 | Newell et al. | |
| 6,918,039 B1 | 7/2005 | Hind et al. | |
| 6,971,072 B1 | 11/2005 | Stein | |
| 7,437,765 B2 * | 10/2008 | Elms et al. ...................... | 726/26 |
| 7,516,477 B2 | 4/2009 | Corby et al. | |

(Continued)

OTHER PUBLICATIONS

"3M Computer Filters for Notebook and LCD Monitors," 3M United States, 1 page (Copyright 1995-2005).

(Continued)

*Primary Examiner* — Edan Orgad
*Assistant Examiner* — Jenise Jackson
(74) *Attorney, Agent, or Firm* — Novak Druce Connolly Bove + Quigg LLP

(57) ABSTRACT

Methods, systems, and computer program products for protecting information on a user interface based on a viewability of the information are disclosed. According to one method, a viewing position of a person other than a user with respect to information on a user interface is identified. An information viewability threshold is determined based on the information on the user interface. Further, an action associated with the user interface is performed based on the identified viewing position and the determined information viewability threshold.

35 Claims, 6 Drawing Sheets

(56) References Cited

U.S. PATENT DOCUMENTS

| | | |
|---|---|---|
| 7,694,148 B2 | 4/2010 | Cheng et al. |
| 2002/0073032 A1* | 6/2002 | Holmes et al. .................. 705/43 |
| 2002/0161582 A1 | 10/2002 | Basson et al. |
| 2003/0006957 A1 | 1/2003 | Colantonio et al. |
| 2003/0174160 A1 | 9/2003 | Deutscher et al. |
| 2004/0015729 A1 | 1/2004 | Elms et al. |
| 2004/0117471 A1* | 6/2004 | Nakamura .................... 709/223 |
| 2004/0183749 A1 | 9/2004 | Vertegaal |
| 2004/0208394 A1* | 10/2004 | Kurata .......................... 382/275 |
| 2004/0239517 A1* | 12/2004 | Coley et al. ................ 340/686.6 |
| 2005/0006154 A1* | 1/2005 | Back et al. ........................ 178/1 |
| 2005/0086515 A1 | 4/2005 | Paris |
| 2005/0132070 A1 | 6/2005 | Redlich et al. |
| 2005/0219228 A1* | 10/2005 | Alameh et al. ................ 345/173 |
| 2005/0243019 A1 | 11/2005 | Fuller et al. |
| 2005/0259845 A1* | 11/2005 | Dehlin et al. ................. 382/103 |
| 2006/0029262 A1 | 2/2006 | Fujimatsu et al. |
| 2006/0080604 A1 | 4/2006 | Anderson |
| 2006/0279528 A1* | 12/2006 | Schobben et al. ............ 345/156 |
| 2008/0052759 A1 | 2/2008 | Kronlund et al. |

OTHER PUBLICATIONS

Knight, "Camera Phonse Recognise Their Owner," NewScientist.com, pp. 1-2 (Mar. 4, 2005).

Qvarfordt, et al., "Conversing With the User Based on Eye-Gaze Patterns," CHI 2005, pp. 1-10 (Apr. 2-7, 2005).

Mantei, et al., "Experiences in the Use of a Media Space," University of Toledo, pp. 203-208 (Copyright 2001).

Broers, et al., "Face Detection and Recognition on a Smart Camera," Proceedings of ACIVS 2004, pp. 119-123 (Aug. 31-Sep. 3, 2004).

Shakhnarovich, et al., "Face Recognition in Subspaces," Mitsubishi Electric Research Laboratories, pp. 1-35 (May 2004).

Krumm, et al., "How a Smart Environment Can Use Perception," Microsoft Corporation, pp. 1-5 (Sep. 2001).

"Privacy Enhanced Computer Display," Mitsubishi Electric Research Laboratories, 1 page (Aug. 2, 2001).

\* cited by examiner

METHODS, SYSTEMS, AND COMPUTER PROGRAM PRODUCTS FOR PROTECTING INFORMATION ON A USER INTERFACE BASED ON A VIEWABILITY OF THE INFORMATION

This application is a continuation of U.S. patent application Ser. No. 11/316,424, titled "METHODS, SYSTEMS, AND COMPUTER PROGRAM PRODUCTS FOR PROTECTING INFORMATION ON A USER INTERFACE BASED ON A VIEWABILITY OF THE INFORMATION" filed Dec. 22, 2005 which is commonly owned with this application, the entire disclosure of which is here incorporated by reference.

TECHNICAL FIELD

The subject matter described herein relates to methods, systems, and computer program products for protecting information on a user interface. More particularly, the subject matter described herein relates to methods, systems, and computer program products for protecting information based on a viewability of the information.

BACKGROUND

Computers and other electronic devices typically include a user interface having an input interface and an output interface. A keyboard is an example of an input interface for receiving information from a user. Further, computers, personal digital assistants (PDAs), mobile telephones, and other electronic devices typically include an output interface, such as a display, for presenting information to a user. The output interface may allow a user to perceive information that is entered via an input interface and the result of the information that is entered via the input interface.

It is often desirable to protect the privacy of information that is viewable on a user interface, such as information presented via an output interface or information entered via an input interface. In a public setting, for example, an onlooker may be able to obtain sensitive information displayed on the display screen of a laptop computer. Further, for example, an onlooker may be able to obtain information by watching the keys of a keyboard as they are depressed by the user.

Some techniques have been developed for protecting the information on a user interface. For example, a computer application may require a user to enter a login name and password for authenticating the user. A login name and password may be required before the user is granted access to sensitive information. However, this technique does not protect the sensitive information from an onlooker near the user input or output interface.

Another technique for protecting information on a user interface includes determining whether a user of the user interface is an authenticated user by capturing an image of the user. The captured image of the user is compared to a stored image for determining whether the images match. If the images match, the user is considered an authenticated user, and the user may be permitted to view information on the user interface. Otherwise, if the images do not match, the user is considered an unauthorized user, and the user may be denied from viewing information on the user interface. However, an onlooker may be able to view information on the user interface when a user has been authenticated and permitted to view information on the user interface. In this case, the onlooker may be able to "shoulder-surf" while the authenticated user operates a device and information is shown on the user interface.

In view of the shortcomings of existing techniques for protecting information on a user interface, there exists a need for improved methods, systems, and computer program products for protecting information on a user interface from persons other than an authorized user, such as onlookers.

SUMMARY

According to one aspect, the subject matter described herein includes a method for protecting information on a user interface. The method includes identifying a viewing position of a person other than a user with respect to information on a user interface. An information viewability threshold is determined based on the information on the user interface. Further, an action associated with the user interface is performed based on the identified viewing position and the determined information viewability threshold.

The subject matter described herein can be implemented as a computer program product comprising computer executable instructions embodied in a computer readable medium. Exemplary computer readable media suitable for implementing the subject matter described herein include disk memory devices, chip memory devices, application specific integrated circuits, and programmable logic devices. In addition, a computer program product that implements the subject matter described herein may be located on a single device or computing platform. Alternatively, the subject matter described herein can be implemented on a computer program product that is distributed across multiple devices or computing platforms.

BRIEF DESCRIPTION OF THE DRAWINGS

Exemplary embodiments of the subject matter will now be explained with reference to the accompanying drawings, of which.

DETAILED DESCRIPTION

Figure 1:
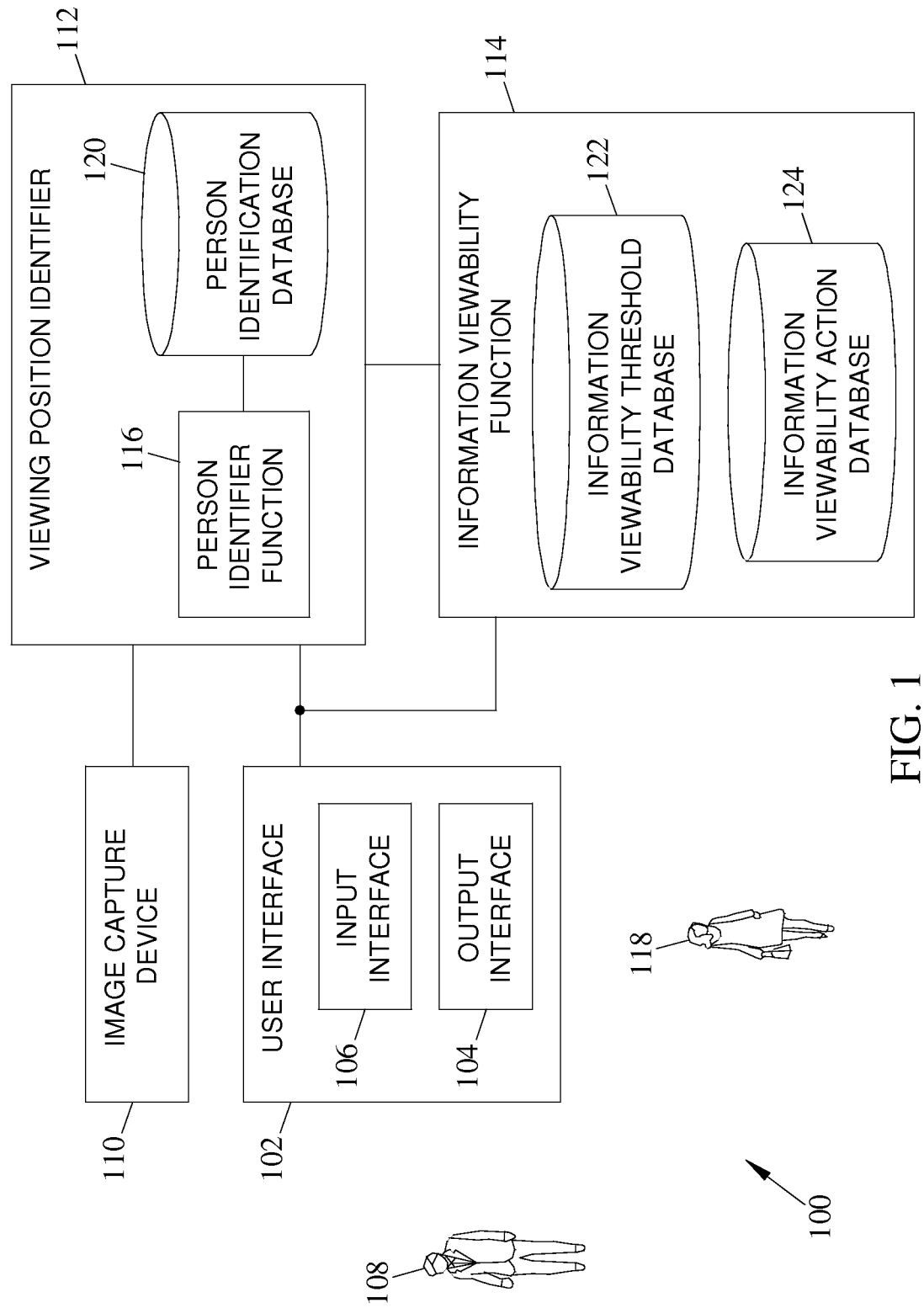
FIG. 1 is a block diagram illustrating an exemplary computer system for protecting information on a user interface according to an embodiment of the subject matter described herein.

According to one aspect, a system for protecting information on a user interface may be implemented as hardware, software, and/or firmware components executing on one or more components of a system having a user interface. FIG. 1 illustrates an example of a computer system 100 for protecting information on a user interface according to an embodiment of the subject matter described herein. Computer system 100 may be any suitable system for presenting information to an operator via a user interface, such as a personal computer, mobile phone, PDA, and the like. Referring to FIG. 1, computer system 100 may include a user interface 102 having an output interface 104 and an input interface 106. Output interface 104 may present or display information that is viewable by one or more persons. For example, the information may be viewable by person 108. Further, output interface 104 may include a display, a printer, a speaker, or any other suitable device with which information may be presented or shown. Input interface 106 may be any suitable device by which a user inputs information. Input interface 106 is operable to receive input information from a user. For example, input interface 106 may be a keyboard, a keypad, a touch screen display, a mouse, or a trackpad. The input of information on input interface 106 may similarly be viewable by person 108. As such, the "viewability" of information on user interface 102 as used herein may be applied to output interface 104 and/or input interface 106.

System 100 may also include an image capture device 110 operable to capture one or more images of persons in position to view information on user interface 102. For example, image capture device may capture one or more images of person 108. Device 110 may be any suitable device for capturing images, such as a still-image camera or video camera. The captured images of person 108 can include a single image of person 108 that indicates the position of person 108 with respect to user interface 102. Further, the captured images of person 108 can include a series of images of person 108 over time for indicating the movement of person 108 with respect to user interface 102. Captured images may be stored in device 110 and communicated to a viewing position identifier 112.

System 100 includes means for identifying a viewing position of a person other than a user with respect to information on user interface 102. For example, viewing position identifier 112 may receive captured images from device 110. Identifier 112 may identify a viewing position of a person in one or more of the captures images with respect to information on user interface 102. Identifier 112 may also identify the movement of person 108 with respect to information on user interface 102 based on a series of captured images. For example, one or more captured images can be used to identify eye movement of the person, the eye position of the person, and/or the facial position of the person. Further, the captured images can be used to identify a distance between person 108 and user interface 102 and/or an angle of person 108 with respect to user interface 102. Identifier 112 may communicate the identified viewing position or positions to an information viewability function 114.

System 100 includes means for determining an information viewability threshold based on the information on user interface 102. For example, information viewability function 114 may determine an information viewability threshold based on the information on user interface 102. In one embodiment, a viewability threshold may be determined based on the sensitivity of the information shown by user interface 102. For example, some information may require a high level of privacy, and thus the information may require a viewability threshold that provides additional protection from onlookers. In another embodiment, the viewability threshold may be based on characteristics of the information shown by user interface 102. For example, the viewability threshold may be based on the size of information displayed by user interface 102. Information with a large size may be easy to read, and thus the information may again require another viewability threshold that provides additional protection from onlookers. In another embodiment, the viewability threshold may be based on the type of user interface showing the information. For example, the viewability threshold may be based on the type of display displaying the information. Information shown on a display having high resolution and wide viewability angles may again require a viewability threshold that provides additional protection from onlookers.

Further, system 100 may include a means for performing an action associated with user interface 102 based on the identified viewing position and the determined information viewability threshold. For example, function 114 may perform an action associated with user interface 102 based on the identified viewing position and the determined information viewability threshold. In accordance with one embodiment, the performed action may include alerting a user of user interface 102 of the presence of a potential onlooker and/or a location of the onlooker. For example, a display may display an icon for indicating the presence of a potential onlooker. In another embodiment, the performed action may include obfuscating information shown by user interface 102 in order to make the information more difficult for a potential onlooker to view. For example, a display displaying the information may be darkened, blurred, or otherwise hidden from view.

Figure 2:
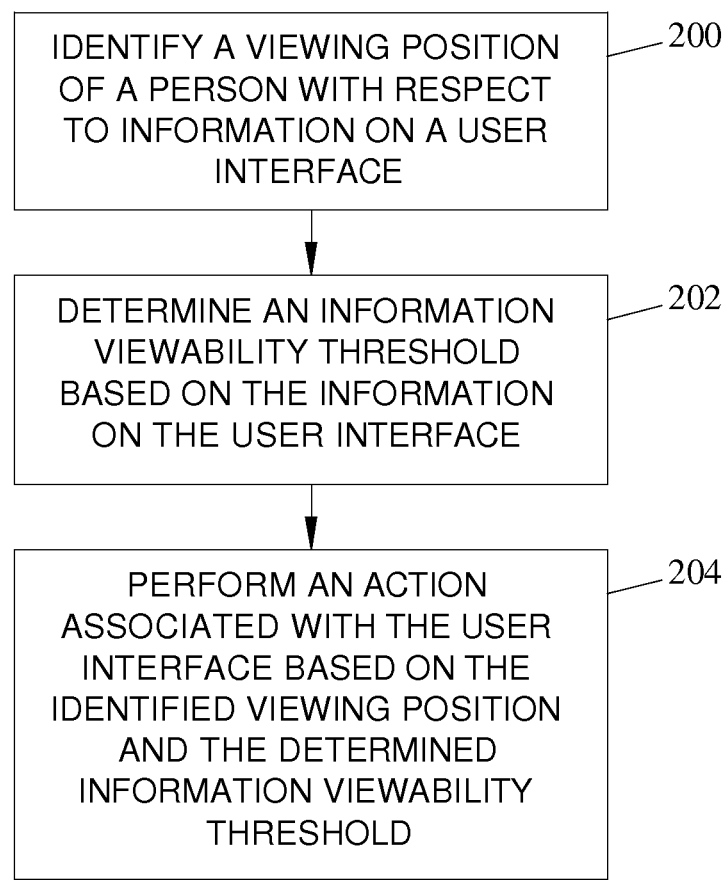
FIG. 2 is a flow chart of an exemplary process for protecting information on a user interface according to an embodiment of the subject matter described herein.

FIG. 2 is a flow chart illustrating an exemplary process for protecting information on a user interface according to an embodiment of the subject matter described herein. Referring to FIG. 2, block 200 includes identifying a viewing position of a person other than a user with respect to information on a user interface. In block 202, an information viewability threshold is determined based on the information on the user interface. An action associated with the user interface is performed based on the identified viewing position and the determined information viewability threshold (block 204). Thus, in this exemplary process, an action associated with a user interface is performed based on a viewing position of a person with respect to information on the user interface. The performed action may make the viewable information on the user interface more difficult for the person to view.

Figure 3A:
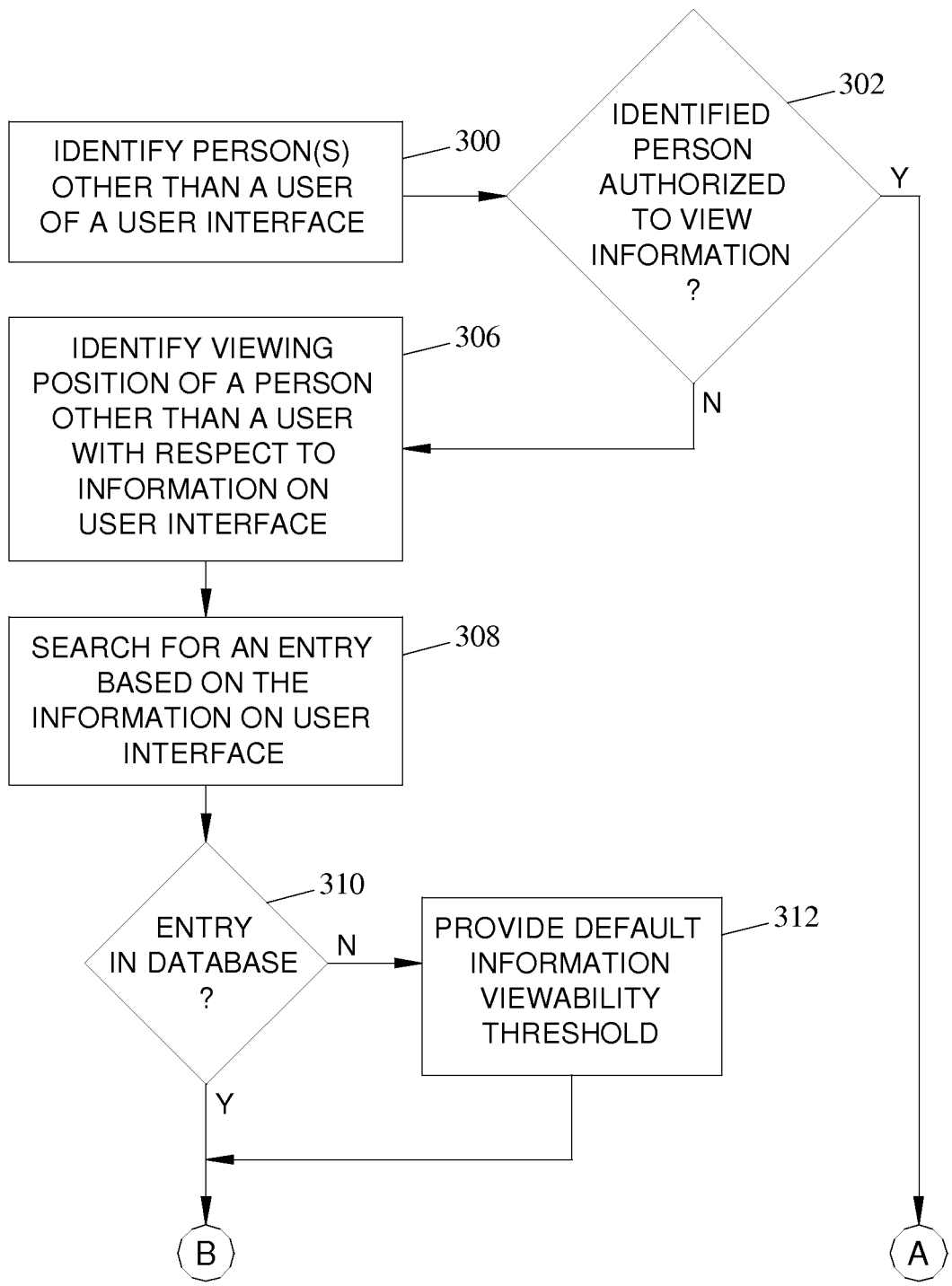
FIGS. 3A and 3B are a flow chart of an exemplary process for protecting information on a user interface shown in FIG. 1 according to an embodiment of the subject matter described herein.
Figure 3B:
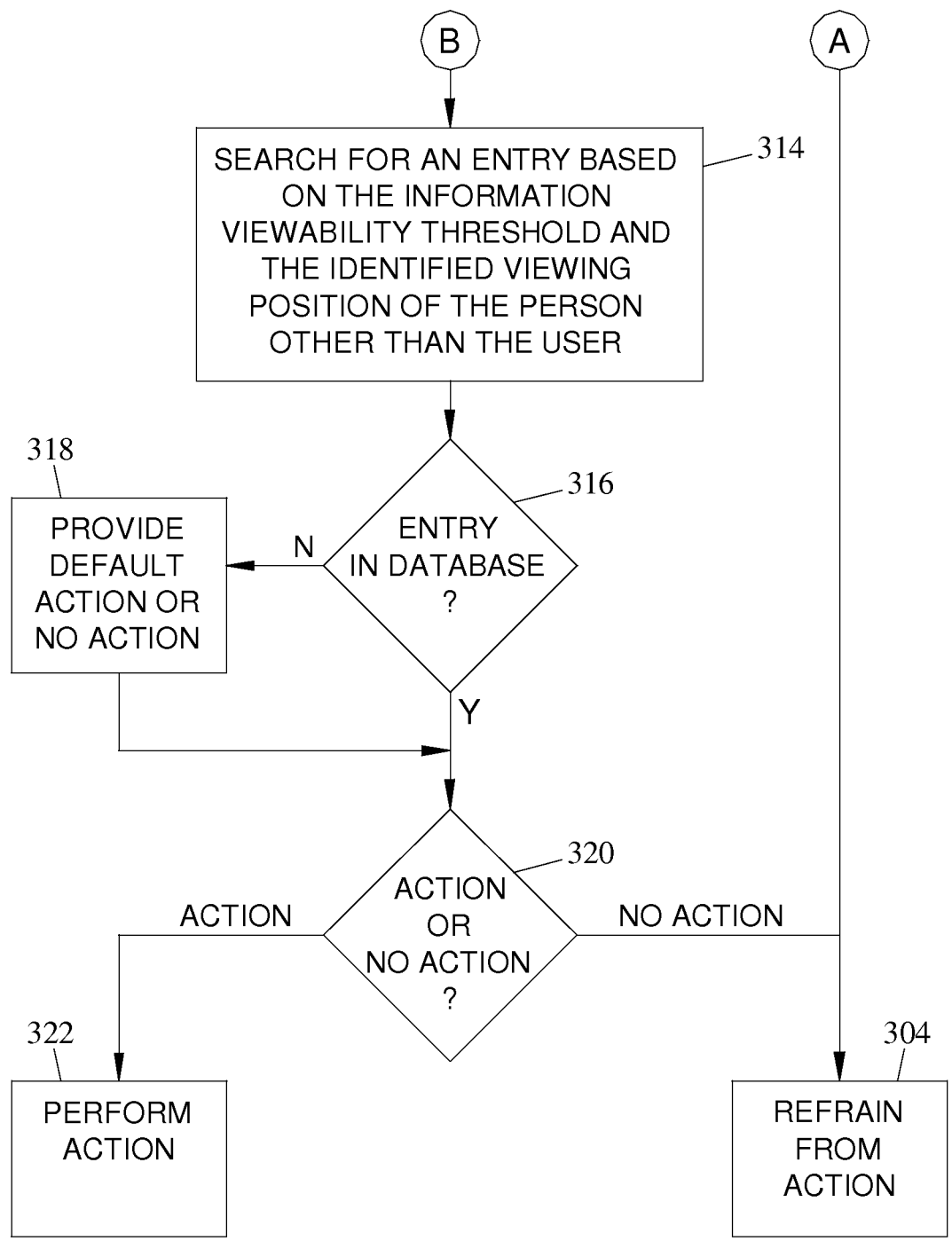

FIGS. 3A and 3B are a flow chart illustrating an exemplary process for protecting information on user interface 102 shown in FIG. 1 according to an embodiment of the subject matter described herein. Referring to FIG. 3A, block 300 includes identifying a person other than a user of user interface 102 with respect to information on user interface 102. In one embodiment, image capture device 110 may capture images of one or more persons. The captured images may be communicated to viewing position identifier 112. Viewing position identifier 112 may include a person identifier function 116 for identifying one or more persons in the captured images. For example, person 118 may be a user of user interface 102, and person 108 may be a person other than a user of user interface 102 or an onlooker of information shown on user interface 102. Image capture device 110 may capture images of persons 108 and 118 and communicate the captured images to function 116. Based on the images, function 116 may determine the positions of persons 108 and 118 with respect to user interface 102. Further, function 116 can compare the determined positions and identify the person closest to user interface 102 as being a user of user interface 102 based on an assumption that the closest person to a user interface is the user of the user interface. In this example, person 118 may be determined to be closer to user interface 102 than person 108. Therefore, person 118 may be identified as the user of user interface 102, and person 108 may be identified as a person other than the user or as a potential onlooker to information on user interface 102.

In another example, a user's image may be identified after a successful login by the user, e.g., after the user provides a user name and password. The user's identified image may be pre-stored and correlated with the login or may be an image taken by image capture device 110 after login. This image can later be used in image comparisons for locating potential onlookers, even while the user is away from user interface 102.

Image capture device 110 may be any suitable device operable to capture an image or other suitable representation of a person by which the person's position, identity, and/or features can be determined. As stated above, image capture device 110 may be a camera, such as a still-image camera or a video camera. The images captured by image capture device 110 may be stored at image capture device 110 or communicated to viewing position identifier 112 for storage. In one embodiment, image capture device 110 is a digital camera including a wide angle lens. The image capture angle of the lens may be at least equal to the angle within which the information on user interface 102 is viewable.

Based on one or more captured images, function 116 may determine a person's position, identity, and/or features. An exemplary method for face recognition is described in U.S. Pat. No. 6,111,517 to Atick et al., issued Aug. 29, 2000 and filed Dec. 30, 1996, the disclosure of which is incorporated by reference herein in its entirety. Briefly, this method includes searching the field of view of a camera for faces. Multiscale search algorithms may initially search for faces in low resolution and switch to high resolution only when the low resolution search indicates a head-like shape. Once a face has been detected, the head's shape, position, size, and pose can be determined. Next, the head may be normalized by scaling, rotating, and warping, so that the face can be registered and mapped into a canonical size and pose. An internal representation scheme can be employed to translate facial data into a unique coded characterization of the face of each individual. Next, the facial characterization can be compared to stored facial characterizations to determine a match. Person identification function 116 may use this method or any other suitable facial recognition method to distinguish authorized users from onlookers.

Further, an exemplary method for determining the locations of image features, such as eye monitoring to determine the point at which the eye is gazing, or measuring the motions of an eye using a captured image is described in U.S. Pat. No. 5,231,674 to Cleveland et al., issued Jul. 27, 1993 and filed May 13, 1991, the disclosure of which is incorporated by reference herein in its entirety. Briefly, this method includes using a camera to capture an image of an eye. Information about the eye's gaze point and/or orientation may be extracted from the eye image based on the location of image features such as edge coordinates between the pupil and iris of the eye and of the corner coordinates of light reflections off the cornea of the eye. Person identifier function 116 may use this method or any other suitable gaze tracking method to identify persons who are onlookers gazing at user interface 102.

In an alternate embodiment, function 116 may determine that a person is an authorized user based on the distance the user is from interface 102 and/or the position of the person in front of interface 102. For example, function 116 may determine whether person 108 is within a predetermined distance from interface 102 and whether person 108 is positioned in front of interface 102. If function 116 determines that person 108 is positioned within the predetermined distance and positioned in or about directly in front of interface 102, the image associated with person 108 may be identified as corresponding to an authorized user. For example, a person's image that is determined to be within three feet of a user interface may be identified as corresponding to an authorized user. Images associated with persons other than the identified user may be identified as potential onlookers. Such authorized status can be revoked when the authorized user is no longer positioned within the predetermined distance and positioned in or about directly in front of interface 102.

In one embodiment, function 116 may detect the position of the eyes of persons in captured images. Based on the determined position of the eyes with respect to interface 102, function 116 may determine whether a person is a user or a potential onlooker. For example, if the eyes are determined to be within a predetermined distance and/or positioned in front of interface 102, the image of the person corresponding with the eyes may be identified as a user. Images associated with other eyes may be identified as eyes corresponding with persons other than a user or as a potential onlooker.

In another embodiment, function 116 may determine that a person is an authorized user based on a person's face in a captured image. For example, function 116 may be able to detect faces in captured images and discriminate between different faces. System 100 may include a person identification database 120 operable to store data for identifying facial images of persons. The stored data may identify a facial image as corresponding to an authorized user of interface 102. Further, the stored data may identify a facial image as being a person unauthorized to view information shown by interface 102. A facial image that is deemed unauthorized may be considered as a potential onlooker of the information shown on interface 102. Further, a facial image that is unidentifiable may be considered as a potential onlooker of the information shown on user interface 102.

In one embodiment, viewing position identifier 112 may be operable to detect a person's position and track the person's movement. For example, identifier 112 may detect the position of a person's eyes and the movement of the detected eyes. One or both eyes of the person may be detected. One type of eye movement that may be used to identify a person as an onlooker is scanning. Scanning may be detected using the method described in the above-referenced patent to Cleveland et al. In another example, identifier 112 may detect the position of a person's face and the movement of the detected face. A person may be identified as an onlooker if a person's face turns towards a display and continues to face the display for a predetermined time period. In contrast, a person who turns briefly towards a display and then turns away may not be identified as an onlooker.

In block 302, function 116 may determine whether the identified person is authorized to view the information on user interface 102. Database 120 may include entries that indicate whether an identified person is authorized to view information shown on user interface 102.

If it is determined that the identified person is authorized to view the information on user interface 102, system 100 may refrain from performing an action associated with interface 102 with respect to the identified person (block 304 shown in FIG. 3B). For example, system 100 may refrain from altering information shown on interface 102 or alerting a user to the presence of the identified person. If it is determined that the identified person is not authorized to view the information on user interface 102, the process may proceed to block 306.

In block 306, identifier 112 may identify a viewing position of a person other than a user with respect to information on user interface 102. For example, identifier 112 may determine the distance of a person other than the user from user interface 102. Further, for example, identifier 112 may determine the angle of a person's position with respect to a surface of interface 102 (e.g., a screen of a display) on which the viewable information is shown. In one embodiment, the person's position can be the position of the person's eyes as detected by identifier 112. Further, for example, the viewing position of a person may be the position of a person's face with respect to user interface 102.

In one embodiment, a plurality of viewing positions of a person other than a user may be identified. For example, a series of captured images of a person may be acquired for identifying movement of a person with respect to user interface 102. A person's movement may indicate whether the person is staring at the user interface or merely glancing at the user interface. For example, if a person's eyes are directed to a user interface greater than 10 seconds, it may be determined that the person is an onlooker to information on the user interface. If a person's eyes are directed to the user interface for less than 1 second, it may be determined that the person is not an onlooker to information on the user interface.

In block 308, an information viewability threshold database 122 may be searched for an entry based on the information on user interface 102. Database 122 may store entries including information viewability thresholds corresponding to the information on user interface 102. Table 1 below shows exemplary entries that may be stored in an information viewability threshold database. It should be pointed out that databases 122 and 124 are logical databases that may be realized using any known information management and processing techniques, including, for example, algorithms, lookup tables, and the like.

TABLE 1

Exemplary Entries in an Information Viewability Threshold Database

| User Interface Type | Information Characteristic | Information Viewability Threshold |
|---|---|---|
| 17" LCD screen display | Font size 12 | Between 45° Left and 45° Right < 10'; and 46°-90° Left and Right < 5' |
| 17" LCD screen display | Font size 16 | Between 45° Left and 45° Right < 20'; and 46°-90° Left and Right < 10' |
| 17" LCD screen display | Image < 680 × 460 pixels | Between 45° Left and 45° Right < 10'; and 46°-90° Left and Right < 5' |
| 17" LCD screen display | Image > 680 × 460 pixels | Between 45° Left and 45° Right < 10'; and 46°-90° Left and Right < 5' |
| PDA with ¼ VGA screen display | Font size 8 | Between 45° Left and 45° Right < 4'; and 46°-90° Left and Right < 2' |
| PDA with ¼ VGA screen display | Font size 10 | Between 45° Left and 45° Right < 8'; and 46°-90° Left and Right < 4' |

In Table 1, an information viewability threshold is determined based on a user interface type and a characteristic of the information shown by user interface 102. For example, if user interface 102 includes a 17" LCD screen display (e.g., output interface 104 is a 17" LCD screen display) displaying text information in font size 12, the viewability threshold is a distance of less than 10 feet between 45 degrees left and 45 degrees right and a distance of less than 5 feet for 46-90 degrees left and right. Further, for example, if user interface 102 includes a PDA with ¼ VGA screen display (e.g., output interface 104 is a ¼ VGA screen display) displaying text information in font size 8, the viewability threshold is a distance of less than 4 feet between 45 degrees left and 45 degrees right, and a distance of less than 2 feet for 46-90 degrees left and right.

In one embodiment, the information viewability threshold may be based on the eye position of a person, the eye movement of a person, and/or the facial orientation of a person with respect to a user interface. For example, an information viewability threshold may be met when a person's eyes are pointing towards user interface 102. In another example, an information viewability threshold may be met when a person's eyes are pointing towards user interface 102 for a predetermined period of time (e.g., greater than 10 seconds). In yet another example, an information viewability threshold may be met when a person's eyes are moving in a predetermined pattern with respect to user interface 102 (e.g., from left to right across a display screen). A threshold may be met when a person's eyes are periodically pointing towards user interface 102. In another example, an information viewability threshold may be met when a person's face is oriented towards user interface for a predetermined period of time. In yet another example, an information viewability threshold may be met when a person's face is periodically oriented towards user interface 102. In each case, the respective determination may be made using gaze detection and/or image analysis performed on a captured image and may be performed using image capture device 110 in conjunction with viewing position identifier 112.

In another embodiment, the information viewability threshold may be based on the type of information shown via a user interface or an application or file presenting the information. For example, information viewability function 114 may determine the privacy sensitivity of information shown by user interface 102. If the information is highly sensitive, the information viewability threshold may be triggered more readily for a person other than the user of the user interface. Highly sensitive data may be data determined to be highly confidential. The privacy sensitivity of information may be calculated based on a variety of criteria. For example, a user may designate data as being sensitive by selecting a sensitivity level associated with the information. In one example, a user may designate a sensitivity level for an application (e.g., the MICROSOFT WORD® word processing application, produced by the Microsoft Corporation of Redmond, Wash.) presenting the information. If a sensitivity level has not been designated for information, the information may inherit the sensitivity level of an application presenting the information. For example, a word processing application may be associated with a sensitivity level of "medium". A user may want to open a particular document in the word processing application with a sensitivity level of "high". In other examples, the display of a game may be associated with a low privacy sensitivity level while a business document may be associated with a high privacy sensitivity level. In addition to content sensitivity or confidentiality, or alternatively, content TYPE information such as file formats (e.g., .jpg, .xls, etc.) may be used to determine sensitivity level.

The privacy sensitivity level may be associated with the information on user interface 102, as discussed above.

In another example, information associated with a password entry may be associated with a particular privacy sensitivity level. For example, entry of a login name and a password may be associated with a privacy sensitivity level of "high." In another example, information protected by the login and password may be associated with a particular privacy sensitivity level.

In another embodiment, the information viewability threshold may be determined based on a combination of factors including a friendliness factor associated with an onlooker, a sensitivity level, and/or a behavior of the person. A friendliness factor may be associated with a person identified by person identifier function 116. For example, a family member or friend may be associated with a high friendliness factor. A person with a low friendliness factor may be an unidentified person or an acquaintance that has been identified and associated with a low friendliness factor.

Table 2 below shows exemplary entries that may be stored in an information viewability threshold database that incorporates a friendliness factor, a sensitivity level, and a behavior, according to another embodiment. Information from Table 1 may also be incorporated into Table 2, or vice versa. In addition, Tables 1 and 2 may be combined into a single table.

In block 310, function 114 determines whether an entry associated with the information on user interface 102 is found in database 122. If an entry is not found in database 122, a default information viewability threshold may be provided for the viewable information (block 312) and the process may proceed to block 314 (shown in FIG. 3B). Otherwise, if an entry is found in database 122, the process may proceed to block 314.

Referring to FIG. 3B, in block 314, an information viewability action database 124 may be searched for an entry based on the information viewability threshold and the identified viewing position of the person other than a user. Database 124 may store entries including actions corresponding to the information viewability threshold and the identified viewing position of a person other than the user. Table 3 below shows exemplary entries that may be stored in an information viewability action database. It should be understood that databases 122 and 124 (and thus Tables 1, 2, and/or 3) may be combined into a common database according to one possible implementation.

TABLE 2

Exemplary Entries in an Information Viewability Threshold Database

| Scenario | Friendliness Factor | Sensitivity Level | Behavior of Person | Total Risk Level | Information Viewability Threshold |
|---|---|---|---|---|---|
| Person using user interface in a home office, and a spouse walks in | Face identified of someone having a friendliness factor of 10 (i.e., a high friendliness factor) | Low | Low Threat (the person glances at the user interface infrequently) | Low | Unlimited Viewing |
| Person using user interface on a full plane in economy class | Face identified of someone having a friendliness factor of 1 (i.e., a low friendliness factor) | High | High Threat (a person looks at the user interface for a long duration) | High | Between 45° Left and 45° Right <20'; and 46°-90° Left and Right <10' |
| Person using user interface on a full plane in economy class | Face identified of someone having a friendliness factor of 5 (i.e., a medium friendliness factor) | High | Low Threat (the person glances at the user interface infrequently) | Medium | Between 45° Left and 45° Right <10'; and 46°-90° Left and Right <5' |

Using Table 2, an information viewability threshold may be determined based on a friendliness factor associated with an identified person and the type of information on the user interface. For example, when a person's face is identified as having a high friendliness factor of 10, the sensitivity level is low, and the behavior of a person is at a low threat level, the total risk level is low and the viewability threshold may allow for unlimited viewing; in effect not carrying out any action in response to detecting the onlooker. In another example, when a person's face is identified as having a low friendliness factor of 1, the behavior of a person is at a high threat level, and the sensitivity level is high, then the total risk level is high and the viewability threshold may be set at less than 20' between 45° left and 45° right and less than 10' between 46°-90° left and right. In yet another example, when a person's face is identified as having a medium friendliness factor of 5, the behavior of a person is at a low threat level, and the sensitivity level is high, then the total risk level is medium and the viewability threshold may be set at less than 10' between 45° left and 45° right and less than 5' between 46°-90° left and right. Other combinations and corresponding viewability thresholds may also be utilized.

TABLE 3

Exemplary Entries in an Information Viewability Action Database

| Identified Viewing Position | Information Viewability Threshold | Action |
|---|---|---|
| 8° Left and 7 feet | Between 45° Left and 45° Right < 10'; and 46°-90° Left and Right < 5' | Reduce font size by 4 points |
| 80° Left and 3 feet | Between 45° Left and 45° Right < 10'; and 46°-90° Left and Right < 5' | Reduce font size by 1 point |
| 5° Left and 12 feet | Between 45° Left and 45° Right < 10'; and 46°-90° Left and Right < 5' | None |
| 82° Right and 6 feet | Between 45° Left and 45° Right < 10'; and 46°-90° Left and Right < 5' | None |

In Table 3, an action is determined based on an identified viewing position and a viewability position threshold. For example, if the identified viewing position is 8° to the left of the front of a user interface and 7 feet from the user interface, the font size of text displayed on the user interface is reduced 4 points by function 114. In another example, if the identified viewing position is 80° to the left of the front of a user interface and 3 feet from the user interface, the font size of text displayed on the user interface is reduced 1 point by function 114. In another example, if the identified viewing position is 82° to the right of the front of a user interface and 6 feet from the user interface, no action is taken by function 114.

Figure 4:
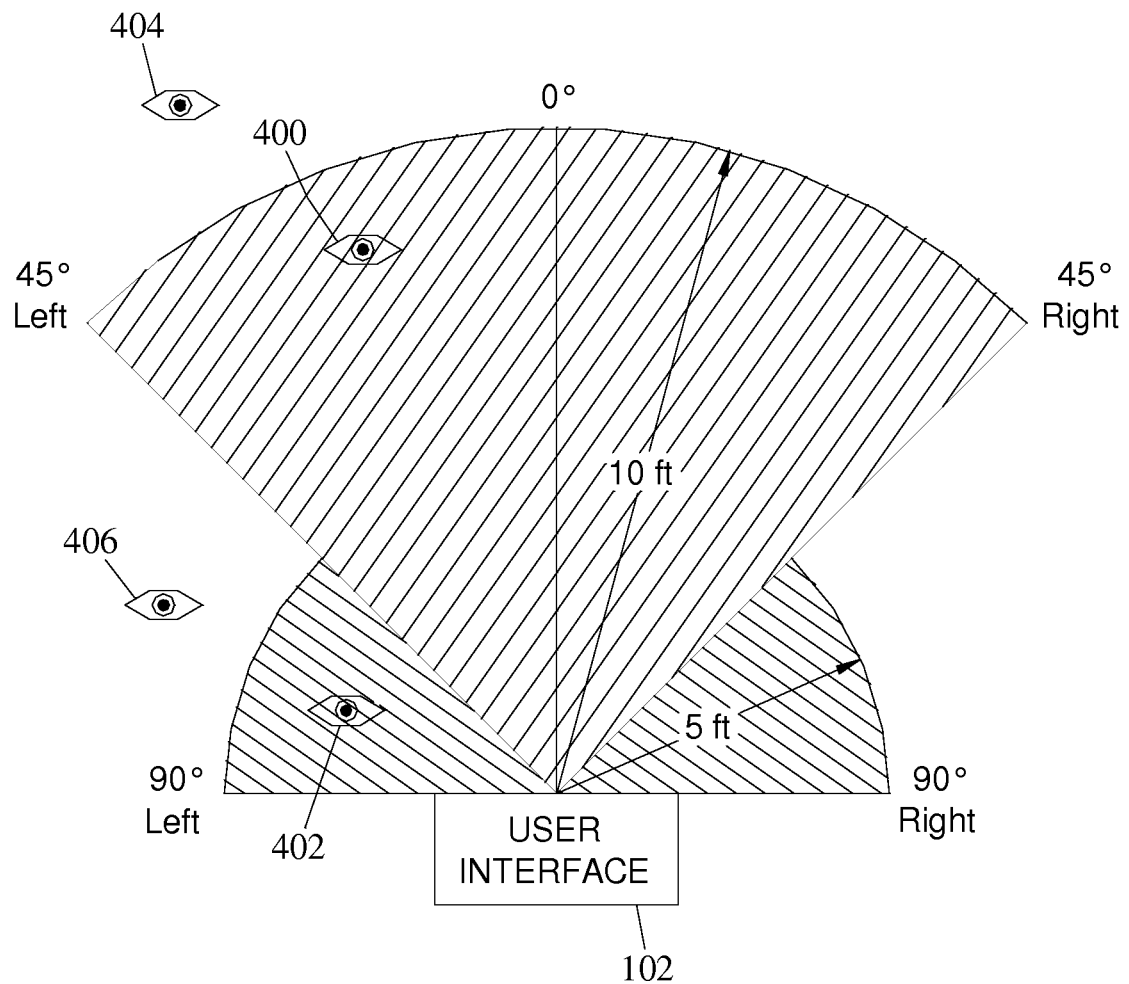
FIG. 4 is a diagram illustrating exemplary positions of a person with respect to the user interface shown in FIG. 1 and viewability thresholds according to an embodiment of the subject matter described herein.

FIG. 4 illustrates exemplary positions of a person with respect to user interface 102 of FIG. 1 and viewability thresholds according to one embodiment of the subject matter described herein. The viewability thresholds correspond to the examples provided in Table 2 above. Referring to FIG. 4, the shaded areas represent threshold areas. If a person other than a user of interface 102 is identified as being positioned within one of the thresholds, an action may be taken by system 100. For example, a person at position 400 is within the threshold defined by being between 45° left and 45° right of the front of user interface 102 and being within 10 feet of user interface 102. In another example, a person at position 402 is within the threshold defined by being between 46°-90° left of the front of user interface 102 and being within 5 feet of user interface 102. In another example, a person at position 404 or position 406 is outside of the defined thresholds. In this example, no action is taken by function 114 when a person is positioned outside of the thresholds.

In block 316, function 114 determines whether an entry associated with the determined information viewability threshold and the identified viewing position of the person other than the user is found in database 124. If an entry is not found in database 124, a default action or no action may be provided (block 318). A default of no action means that system 100 refrains from performing an action to protect information on interface 102 from the identified person. If an entry is found in database 124, the process proceeds to block 320.

In block 320, function 114 may determine whether to perform an action or not to protect information on interface 102 from the identified person. If an entry is found in database 124 and the entry indicates to perform no action, system 100 refrains from performing an action to protect information on interface 102 from the identified person (block 304). If a default action is provided and the default indicates to perform no action, system 100 refrains from performing an action (block 304). Further, if an entry is found in database 124 and the entry indicates to perform an action, function 114 performs the action indicated by the entry (block 322). If a default action is provided and the default indicates to perform an action, function 114 performs the action indicated by the entry (block 322). The action may include obfuscating information shown by user interface 102 or alerting a user about the identified person.

In one embodiment, the performance of an action in block 322 may include obfuscating or reformatting information shown on user interface 102 such that the information is more difficult for a person to perceive. For example, a display screen may be blurred in order to make text information more difficult to perceive. In yet another example, a display screen may be darkened. In another example, a display screen may be turned off in order to prevent an onlooker from perceiving information. In yet another example, colors on a display screen may be inversed. In another example, a zoom level of the information, be it text or images, may be decreased to prevent an onlooker from perceiving information.

In another embodiment, the performance of an action in block 322 may include reducing the size of text information on a display screen in order to make text information more difficult for a potential onlooker to perceive. The reduction of text size may be based on the position of a potential onlooker and/or a position of a user of interface 102. The text size may be reduced such that the user of interface 102 can perceive the information, and the potential onlooker cannot perceive the information.

In another embodiment, the performance of an action in block 322 may include reconfiguring input interface 106 such that the information entered into the interface is more secure. For example, with regard to a keyboard or a keypad, the orientation, character set, and display properties of the keys or buttons of the keyboard or keypad may be reconfigured. In one embodiment, reconfiguration includes changing the language input when one or more keys are depressed. In another embodiment, reconfiguration may include character or symbol replacement. An end user or application receiving the input data may identify the replacement. In yet another embodiment, an operator may define the reconfiguration of one or more keys. In another embodiment, reconfiguration may include not displaying characters on a display when data is input. In yet another embodiment, the keys displayed on input interface 106 may change when a determined privacy level is high. For example, the keys displayed on the keypad of a PDA may change such that the data actually entered when a key is depressed is different than the symbol for the key.

Figure 5A:
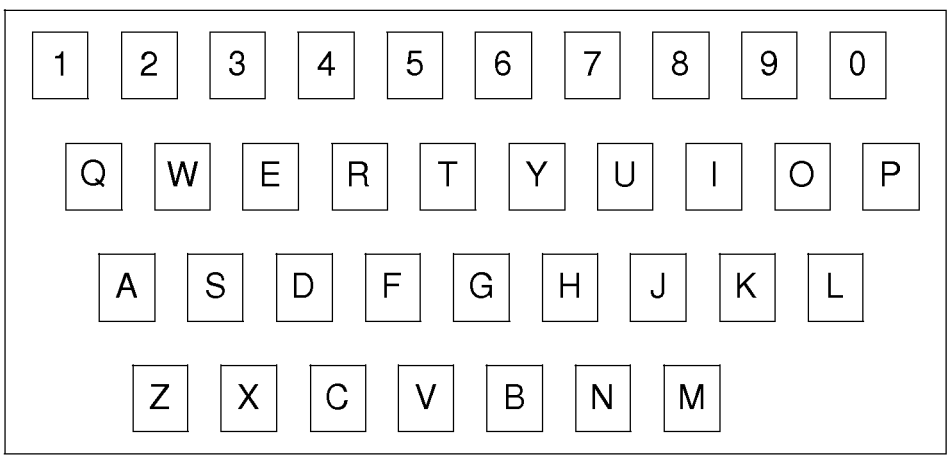
FIG. 5A is a block diagram illustrating an exemplary keyboard before being reconfigured according to an embodiment of the subject matter described herein.
Figure 5B:
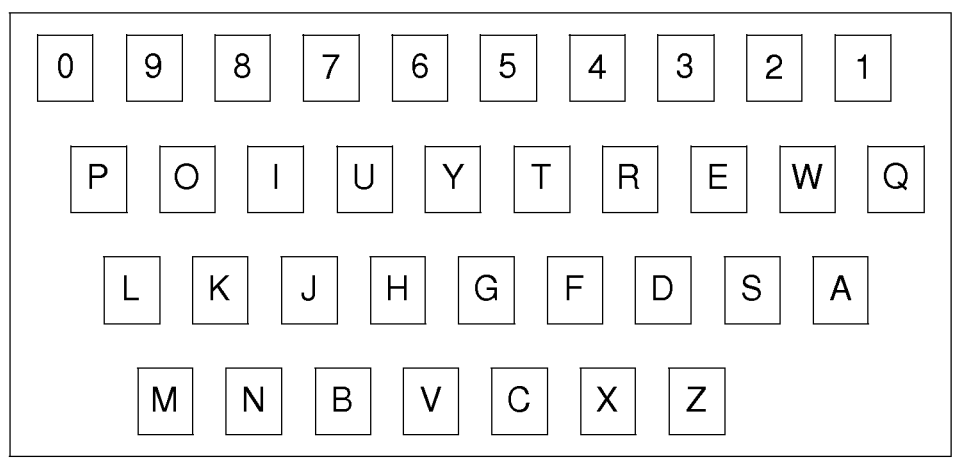
FIG. 5B is a block diagram illustrating an exemplary keyboard after being reconfigured according to an embodiment of the subject matter described herein.

FIGS. 5A and 5B illustrate an example of a keyboard 500 before reconfiguration and after reconfiguration, respectively, according to an embodiment of the subject matter described herein. In this example, keyboard 500 is a "QWERTY" keyboard. FIG. 5A shows the arrangement of the keys before reconfiguration and as the keys are actually labeled. For example, before reconfiguration, when the key labeled "Q" is depressed, the letter "Q" will be entered. FIG. 5B shows the keys of keyboard 500 after reconfiguration. The labeling of the keys after reconfiguration remains the same as before reconfiguration. The mapping of the keys changes after reconfiguration. In this example, when the key labeled "Q" is depressed after reconfiguration, the letter "P" will be entered.

Referring again to FIG. 3B, in yet another embodiment, the performance of an action in block 322 may include alerting a user of user interface 102 to the presence of a potential onlooker. In one example, an alert may include blinking a light emitting diode (LED) or other suitable light emitter on system 100 to indicate to the user of the presence of a potential onlooker. In another example, an alert may include sounding an alarm.

In yet another example, an alert may include indicating the position of a potential onlooker to a user of user interface 102. For example, output interface 104 may display text indicating a potential onlooker, such as "Potential onlooker located 4 feet behind you, and 45 degrees to your left". In another example, output interface 104 may display an image indicating the potential onlooker. In the displayed image, the onlooker can be indicated by a flag, circle, or otherwise differentiated in the image.

Once alerted to a potential onlooker, the user may act to prevent the potential onlooker from perceiving the information. For example, the user may stop entering information via input interface 106. In another example, the user may stop information from being displayed on output interface 104. In yet another example, the user may reposition user interface 102 such that the potential onlooker cannot perceive the information.

In one embodiment, a user may specify to system 100 that the system is operating in a secure environment. If it is specified that system 100 is in a secure environment, system 100 may refrain from performing an action (such as in block 304 of FIG. 3B). When system 100 is moved to a less secure environment, the user may specify the environment such that the performance of actions is enabled.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for protecting information on a user interface of a device, the method comprising:
    identifying, by the device, a viewing position of a person other than a user with respect to information on the user interface of the device;
    determining, by the device, an information viewability threshold for the person based on the information cm the user interface, wherein the information viewability threshold is variable based on at least one of a viewability of the information as presented by the user interface or a characteristic of the person, and wherein determining the information viewability threshold for the person includes determining sensitivity of the information on the user interface and adjusting the viewability threshold based on the sensitivity of the information; and
    performing, by the device, an action associated with the user interface based on the identified viewing position and a relationship of the identified viewing position to the determined information viewability threshold.

2. The method of claim 1 wherein performing the action associated with the user interface includes altering at least one of a font size or a zoom level of the information.

3. The method of claim 2 wherein adjusting the viewability threshold includes adjusting the viewability threshold based on the at least one of the font size or the zoom level of the information.

4. The method of claim 1 wherein performing an action associated with the user interface includes displaying an icon for indicating the presence of the person.

5. The method of claim 1 wherein performing an action associated with the user interface includes at least one of darkening or blurring a display of the information.

6. The method of claim 1 further comprising:
    determining an identity of the person; and
    determining whether the person is authorized to view the information on the user interface,
    wherein determining the information viewability threshold includes determining the information viewability threshold based on whether the person is authorized to view the information on the user interface.

7. The method of claim 6 wherein determining identity of the person includes:
    capturing an image of the person; and
    comparing the image of the person to mages stored in a database.

8. The method of claim 7 wherein comparing the image of the person to images stored in a database includes detecting the face of the person in the image and comparing the face of the person to facial images stored in the database.

9. The method of claim 1 wherein identifying a viewing position the person includes:
    determining a movement of the person; and
    determining based on the movement of the person whether the person is staring at the user interface or glancing at the user interface.

10. The method of claim 1 wherein the characteristic of the person includes at least one of an eye position of the person, an eye movement of the person, or a facial orientation of the person.

11. The method of claim 1 wherein the characteristic of the person includes at least one of a friendliness factor of the person or a behavior of the person.

12. A system for protecting information on a user interface of a device, the system comprising system components including:
    a viewing position identifier component configured to identify a viewing position of a person other than a user with respect to information on the user interface of the device; and
    an information viewability function component configured to determine an information viewability threshold for the person based on the information on the user interface, wherein the information viewability is variable based on at least one of a viewability of the information as presented by the user interface or a characteristic of the person, wherein the information viewability function component is configured to perform an action associated with the user interface based on the identified viewing position and a relationship of the identified viewing position to the determined information viewability threshold, and wherein the information viewability function component is configured to determine sensitivity of the information on the user interface and to adjust the viewability threshold based on the sensitivity of the information as part of determining the information viewability threshold for the person,
    wherein at least one of the system components includes at least one electronic hardware component.

13. The system of claim 12 wherein the information viewability function is further configured to alter at least one of a font size or a zoom level of the information as part of performing the action associated with the user interface.

14. The system of claim 13 wherein the information viewability function is further configured to adjust the viewability threshold based on the at least one of the font size or the zoom level of the information.

15. The system of claim 12 wherein the information viewability function component is further configured to display an icon for indicating the presence of the person.

16. The system of claim 12 wherein the user interface is a display operable to display the information, and wherein the information viewability function component is further configured to control the display for blurring or darkening the information shown on the display.

17. The system of claim 12 further comprising a person identifier component configured to determine an identity of the person and to determine whether the person is authorized to view the information on the user interface, and wherein the information viewability function component is further configured to determine the information viewability threshold based on whether the person is authorized to view the information on the user interface.

18. The system of claim 17 further comprising an image capture device configured to capture an image of the person other than the user, and wherein the person identifier component is configured to compare the image of the person other than the user to images stored in a database.

19. The system of claim 18 wherein the person identifier component is configured to compare the image of the person other than the user by performing operations including detecting the face of the person in the image and comparing the face of the person to facial images.

20. The system of claim 12 wherein the viewing position identifier component is further configured to determine a movement of the person and determine based on the movement of the person whether the person is staring at the user interface or glancing at the user interface.

21. The system of claim 12 wherein the characteristic of the person includes at least one of an eye position of the person, an eye movement of the person, or a facial orientation of the person.

22. The system of claim 12 wherein the characteristic of the person includes at least one of a friendliness factor of the person or a behavior of the person.

23. A system for protecting information on a user interface the system comprising components including:
  means for identifying a viewing position of a person other than a user with respect to information on the user interface;
  means for determining an information viewability threshold for the person based on the information on the user interface, wherein the information viewability threshold is variable based on at least one of a viewability of the information as presented by the user interface or a characteristic of the person, and wherein the means for determining the information viewability threshold for the person is configured to determine sensitivity of the information on the user interface and to adjust the viewability threshold based on the sensitivity of the information; and
  means for performing an action associated with the user interface based on the identified viewing position and a relationship of the identified computing system and the determined information viewability threshold,
  wherein at least one of the means includes at least one electronic hardware component.

24. A non-transitory computer readable medium containing executable instructions that, if executed, cause the implementation of operations comprising:
  identifying a viewing position of a person other than a user with respect to information on a user interface;
  determining an information viewability threshold for the person based on the information on the user interface, wherein the information viewability threshold is variable based on at least one of a viewability of the information as presented by the user interface or a characteristic of the person, and wherein determining the information viewability threshold for the person includes determining sensitivity of the information on the user interface and adjusting the viewability threshold based on the sensitivity of the information; and
  performing an action associated with the use interface based on the identified viewing position and a relationship of the identified viewing position to the determined information viewability threshold.

25. The medium of claim 24, wherein performing the action associated with the user interface includes altering at least one of font size or a zoom level of the information.

26. The medium of claim 25, wherein adjusting the viewability threshold includes adjusting the viewability threshold based on the at least one of the font size or the zoom level of the information.

27. The medium of claim 24, wherein performing an action associated with the user interface includes displaying an icon for indicating the presence of the person.

28. The medium of claim 24, wherein performing an action associated with the user interface includes at least one of darkening or blurring a display of the information.

29. The medium of claim 24, wherein the operations further comprise:
  determining an identity of the person; and
  determining whether the person is authorized to view the information on the user interface,
  wherein determining the information viewability threshold includes determining the information viewability threshold based on whether the person is authorized to view the information on the user interface.

30. The medium of claim 29, wherein determining an identity of the person includes:
  capturing an image of the person; and
  comparing the image of the person to images stored in a database.

31. The medium of claim 30, wherein comparing the image of the person to images stored in a database includes detecting the face of the person in the image and comparing the face of the person to facial images stored in the database.

32. The medium of claim 24, wherein identifying a viewing position of the person includes:
  determining a movement of the person; and
  determining based on the movement of the person whether the person is staring at the user interface or glancing at the user interface.

33. The medium of claim 24, wherein the characteristic of the person includes at least one of an eye position of the person, an eye movement of the person, or a facial orientation of the person.

34. The medium of claim 24, wherein the characteristic of the person includes at least one of a friendliness factor of the person or a behavior of the person.

35. The system of claim 12, further comprising an image capture device coupled to the viewing position identifier component.

* * * * *

UNITED STATES PATENT AND TRADEMARK OFFICE
CERTIFICATE OF CORRECTION

PATENT NO. : 8,526,072 B2
APPLICATION NO. : 12/828346
DATED : September 3, 2013
INVENTOR(S) : Singh et al.

It is certified that error appears in the above-identified patent and that said Letters Patent is hereby corrected as shown below:

On Title Page 2, in Item (56), under "OTHER PUBLICATIONS", in Column 2, Line 1, delete "Phonse" and insert -- Phones --, therefor.

In the Specification

In Columns 9-10, in Table 2, under "Sensitivity Level", Line 14, delete "plan" and insert -- plan) --, therefor.

In the Claims

In Column 13, Line 18, in Claim 1, delete "cm the" and insert -- on the --, therefor.

In Column 13, Line 53, in Claim 7, delete "determining identity" and insert -- determining an identity --, therefor.

In Column 13, Line 56, in Claim 7, delete "mages" and insert -- images --, therefor.

In Column 13, Line 63, in Claim 9, delete "position the" and insert -- position of the --, therefor.

In Column 15, Line 13, in Claim 23, delete "interface" and insert -- interface, --, therefor.

In Column 15, Line 50, in Claim 24, delete "use" and insert -- users --, therefor.

In Column 16, Line 5, in Claim 25, delete "of font" and insert -- of a font --, therefor.

Signed and Sealed this
First Day of April, 2014

Michelle K. Lee
*Deputy Director of the United States Patent and Trademark Office*